US005979808A

United States Patent [19]

Vogelgesang

[11] Patent Number: 5,979,808

[45] Date of Patent: Nov. 9, 1999

[54] MILLING ARRANGEMENT

[75] Inventor: Claus-Joseph Vogelgesang, Mandelbachtel, Germany

[73] Assignee: Deere & Company, Moline, Ill.

[21] Appl. No.: 09/016,093

[22] Filed: Jan. 30, 1998

[30] Foreign Application Priority Data

Jan. 31, 1997 [DE] Germany ........................... 197 03 486

[51] Int. Cl.$^{6}$ .................................................... B02C 18/16

[52] U.S. Cl. .......................................................... 241/236

[58] Field of Search .................................... 241/236, 294, 241/295, 101.742

[56] References Cited

U.S. PATENT DOCUMENTS 5,048,764 9/1991 Flament .................................. 241/236

FOREIGN PATENT DOCUMENTS 18722 4/1914 Denmark ............................... 241/236
26 21 292 11/1977 Germany .
41 22 338 7/1993 Germany .

*Primary Examiner*—Mark Rosenbaum

[57] ABSTRACT

A forage harvester is equipped with a milling arrangement or kernel processor comprising a pair of rolls which are mounted on parallel axes and adapted for being counter-rotated so as to operate on chopped crop products introduced into the nip of the rolls. The rolls each have an outer circumference defined by larger and smaller diameter sections arranged one after the other along the length of the roll. In one embodiment the larger diameter sections of one roll are located in an annular groove defined between the larger diameter sections of the other roll, these sections being opposite to the smaller diameter sections of the other roll. The overlap between the large diameter sections of the rolls defines shear faces at opposite sides of the sections for cutting crop parts into smaller pieces. The outer circumference of these smaller and larger diameter sections are each provided with a tooth profile and the respective profiles of the opposed sections are spaced apart to form a gap which is sized relative to the size of kernel being processed so that the kernel is split or crushed as it passed through the nip of the rolls. According a second embodiment, the large diameter sections of one of the rolls are each in the form of a flat cutting disk having an outer portion that runs through a slot defined between large diameter sections of the other roll. In this case, the one roll has small diameter sections which are identical to and respectively disposed opposite the large diameter sections of the other roll. These latter mentioned oppositely disposed sections are each provided with tooth profiles like those of the sections of the first embodiment.

3 Claims, 2 Drawing Sheets 40
39
39
36
38
30
34
32
34
31
40
38
36

36
46
34
30'
Z
32
34
31'
44
36

46
40
44
32
40

MILLING ARRANGEMENT

BACKGROUND OF THE INVENTION

The present invention concerns a milling arrangement, commonly called a kernel processor, with two rolls extending parallel to each other for the milling of chopped forage crop.

German Patent No. 41 22 338, granted Jul. 22, 1993, reveals a milling arrangement comprising two rolls mounted for rotation about axes that are parallel to each other and, with the rolls being spaced from each other so as to leave a gap between them that is sized such that kernels, for example corn kernels, still contained in chopped forage crop, are grated or at least partially crushed, so that they can be digested more easily. Each of these rolls is composed of a multitude of double-wedge-shaped sections that define a wedge-shaped valley between them into each of which a double-wedge-shaped section of the opposing roll can enter. This configuration is intended to generate an enlarged profile surface that is less prone to clogging and provides a greater flow rate than the prior art rolls. However, the manufacturing cost of rolls having this configuration is very high.

German Patent Application No. 26 21 292, published Nov. 24, 1977, discloses a forage harvester equipped with a milling arrangement including a pair of cooperating rolls, with each roll comprising a plurality of spaced apart disks having peripheral teeth. The rolls are mounted such that the disks of one enter the spaces between the disks of the other and such that a gap exists between the toothed periphery of the disks of one roll and the outer surface of the drum supporting the disks of the other roll. Rolls made in accordance with this teaching have the drawbacks of being relatively costly to manufacture and of defining gaps of such character that thin leaves, such as small husks, pass through the gaps without being further reduced.

SUMMARY OF THE INVENTION

According to the present invention, there is provided an improved milling arrangement of a type employing a pair of cooperating rolls.

A broad object of the invention is to provide a milling roll design which is very simple and effective, yet relatively inexpensive.

An object of the invention is to provide milling rolls with each roll having a circumference having a profile comprising a plurality of first and second sections in the form of circular discs and/or plates and/or grooves disposed in adjacent alternating fashion along the axis of the roll, with the first sections being of a larger diameter than the second sections and with outer portions of the first sections of one roll being disposed in rubbing contact with outer portions of first or second sections of the other roll such that the side edges of the sections at the zones of rubbing contact will cooperate to shear crop into small pieces.

A more specific object of the invention is to provide milling rolls, as defined in the immediately preceding object, wherein, in accordance with a first embodiment, the first and second sections of each of the pair of rolls are separate circular plates having the same axial width and having peripheral teeth, and with the teeth of the first sections of one roll being disposed opposite to and spaced from the teeth of the second sections of the other roll, to form gaps sized so that kernels of the forage to be milled will be abraded or crushed when they pass between the rolls.

Yet another specific object of the invention is to provide milling rolls, as defined in the second object mentioned above, wherein, in accordance with a second embodiment, the first sections of one roll and the second sections of the other roll are in the form of circular plates having peripheral teeth, and with the second sections of the one roll being grooves and the first sections of the other roll being flat discs having outer peripheral portions disposed for entering the grooves of the one roll.

These and other objects will become apparent from a reading of the ensuing description together with the appended drawings.

DESCRIPTION OF THE PREFERRED EMBODIMENT

Figure 1:
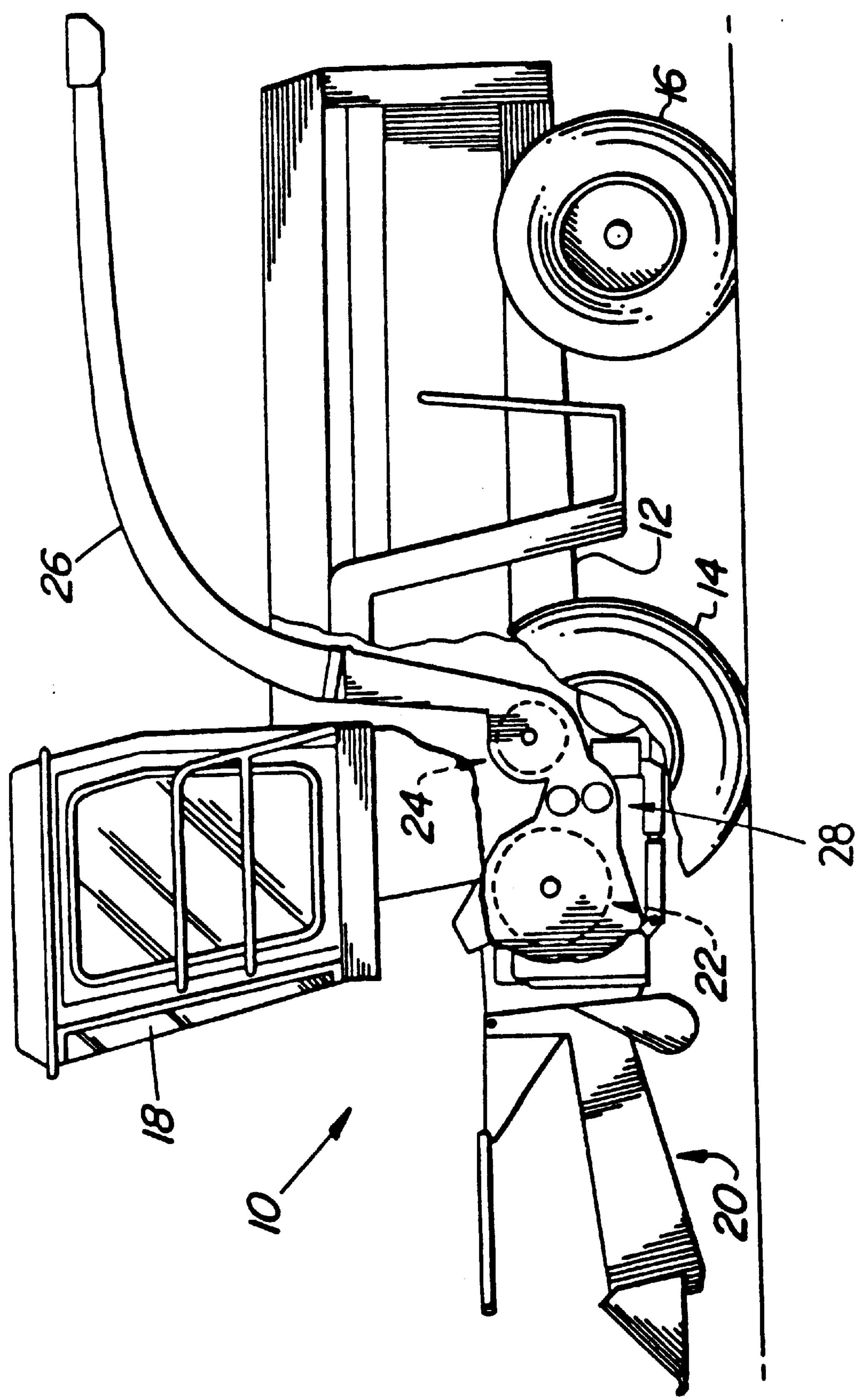
FIG. 1 is a left side elevational view of a self-propelled forage harvester equipped with a milling arrangement of the type with which the present invention is particularly adapted for use.

A harvesting machine 10, shown in FIG. 1 in the form of a self-propelled forage harvester, is supported on a frame 12 that is carried on front and rear wheels 14 and 16. The harvesting machine 10 is controlled from an operator's cab 18, from which a crop recovery attachment or pickup 20 can be observed visually. Crop, for example corn, grass and the like, taken from the ground by the crop recovery attachment 20 is conducted to a chopper drum 22, which chops it into small pieces and delivers it to a conveyor 24. The crop leaves the harvesting machine 10 through a delivery pipe 26 which can be rotated to an accompanying trailer. A milling arrangement 28, commonly called a kernel processor, is located between the chopper drum 22 and the conveyor 24 and delivers the crop to be conveyed tangentially to the conveyor 24. Further details of the harvesting machine 10 do not require further description since these are known in themselves. The location of the milling arrangement 28 is not critical, for example, it can also be provided downstream of the conveyor 24.

Figure 2:
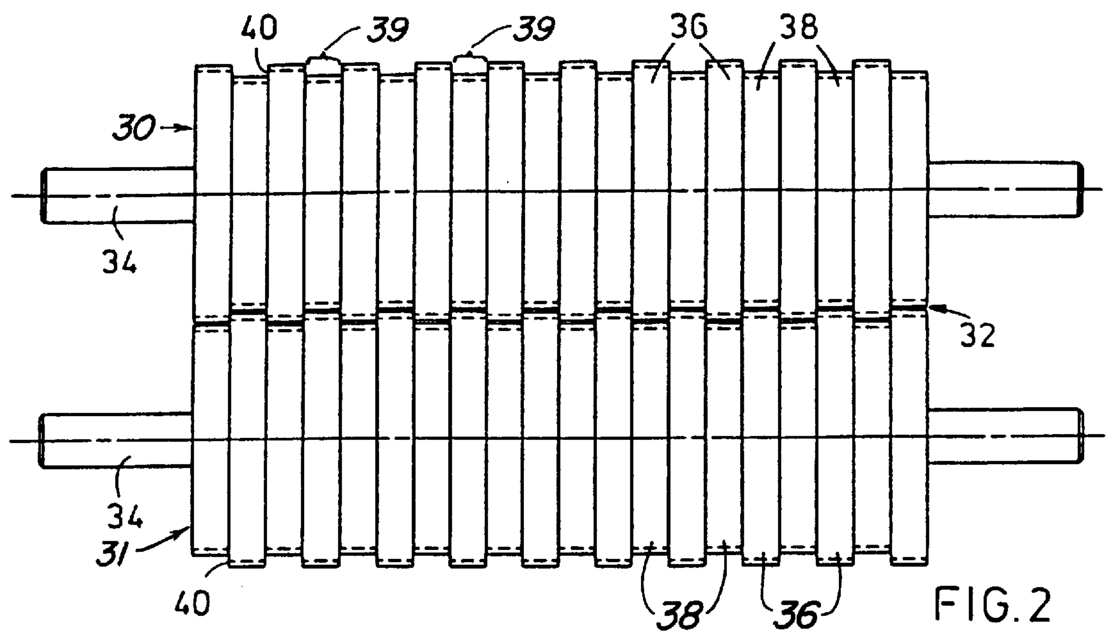
FIG. 2 is a front elevational view of a pair of rolls having separate first and second sections constructed in accordance with a first embodiment of the invention.

Referring now to FIG. 2, there is shown a first embodiment of the milling arrangement 28 formed essentially by upper and lower rolls 30 and 31 whose axes of rotation extend parallel to each other and are spaced from each other such as to leave a gap 32 between the rolls through which the harvested crop passes. Specifically, the rolls 30 and 31 each include a throughshaft 34, although stub shafts at the opposite ends of the rolls could be used in other variations of the rolls that are mentioned below. The shafts 34 of both rolls 31 and 32 are each rotatably supported at opposite ends by bearings, not shown, which are located in carriers or in the side walls of a housing. Both shafts 34 are equipped with a drive gear, not shown, by means of which the rolls can be rotated in opposite directions, either at the same speed or at differing speeds, to partially crush and/or to further reduce crop passing through the gap 32. Depending on harvesting conditions, the gap 32 may be adjusted to varying widths using arrangements, not shown in the drawing but well known in the art.

Each of the rolls 30 and 31 is constructed of a plurality of separate, large and small diameter circular plates, or alternatively, ring sections 36 and 38, respectively, which are arranged in alternating fashion, one after the other, axially along and coaxially to the axis of rotation of the shaft 34. The end faces of the large and small diameter plate sections 36 and 38 are immediately adjacent to one another and are fixed to the shaft 34, or on a carrier roll (not shown) that is fixed to the shaft, by means of clamping screws, tightening devices, wedges, clamping nuts or the like, not shown. The large and small diameter sections 36 and 38 are of equal width in the axial direction so as to in effect form a plurality of annular grooves 39 between adjacent ones of the large diameter sections 36. The series of sections 36 and 38 of the roll 30 are offset by this width relative to the series of sections 36 and 38 of the roll 31 so that the radially outer portions of the large diameter sections 36 of one of the rolls are respectively received in the grooves 39 of the other roll where they cooperate with an end face or end faces 40 of radially outer portions of the sections 38 of the other roll, the opposed end faces 40 rubbing together thus forming a shear which acts to further reduce the size of crop pieces entering between the co-acting surfaces. Further, the radially outer portions each of the sections 36 and 38 are provided with a tooth profile 42, with the tooth profiles of the sections 36 of the roll 30 being respectively opposed to the tooth profiles of the sections 38 of the roll 31, and vice-versa, with the opposed profiles 42 being spaced so as to form the gap 32 and with the tooth profiles 42 being configured and the gap 32 being sized in such a way crop kernels, for example corn kernels, that enter the gap 32 between opposing rolls 30 and 31 are partially crushed. In the disclosed embodiment, the tooth depth is approximately 5 mm. and hence the difference in the diameters of the two sections 36 and 38 is at least 10 mm. and the width of the sections is approximately 25 mm. The teeth and the tooth spaces of the tooth profiles 42 extend in the longitudinal direction of the shaft 34 and form a continuous outer surface over the total lengths of the rolls 30 and 31 which are used for processing the crop.

In the preferred embodiment, according to FIG. 2, the sections 36 and 38 each consist of solid material and extend from the tooth profile 42 to the shaft 34, to which they are fastened directly or indirectly so as to be fixed for rotation with the shaft. However, the sections 36 and 38 are hardened only in the region of their tooth profiles. According to a first alternate construction, the sections 36 and 38 could also be configured as spokes in the region between the tooth profiles 42 and the shaft 34. According to another alternate, the shaft 34 could have a cylindrical carrier roll of relatively large diameter fixed thereon with the sections 36 and 38 being configured as rings, which are slid onto and fastened to the carrier roll. In each instance the large diameter sections 36 would alternate with the small diameter sections 38.

Figure 3:
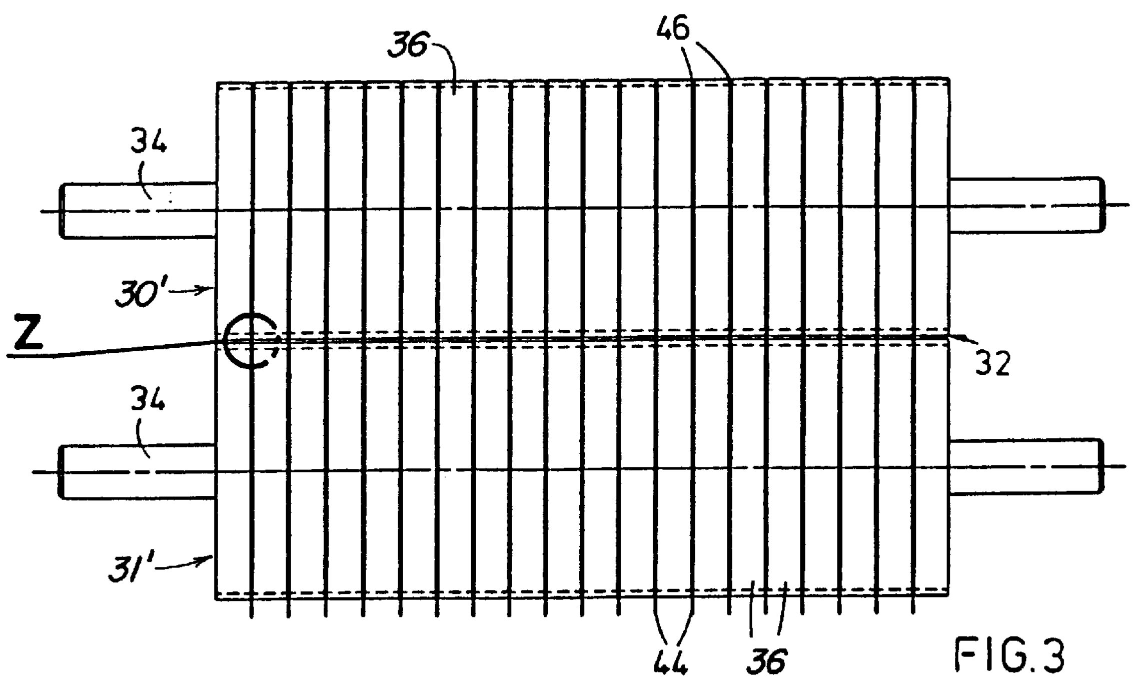
FIG. 3 is a front elevational view of a pair of rolls having separate first and second sections constructed in accordance with a second embodiment of the invention.
Figure 4:
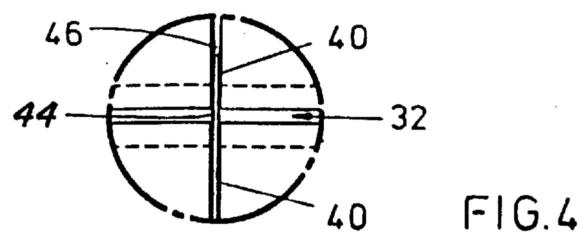
FIG. 4 shows an enlarged view of a circular section taken at Z of FIG. 2.

Referring to FIGS. 3 and 4, there is shown a second embodiment, wherein components, similar to those described above are given the same reference numerals. Specifically, shown is a milling arrangemeynt 28' comprising upper and lower rolls 30' and 31', respectively. The rolls 30' and 31' each include the shaft 34 on which is mounted a plurality of the identical sections 36, in the form of circular plates having the peripheral tooth profiles 42, the tooth profiles of the sections 36 of the roll 30' being respectively located in opposed, spaced relationship to the tooth profiles of the sections 36 of the roll 31' so as to define the gap 32.

As used with the lower roll 31', the sections 36 are small diameter sections which sandwich large diameter sections, in the form of cutting disks 44 preferably made from relatively thin sheet steel. The disks 44 have a diameter which is 2 to 10 mm. larger than that of the small diameter sections 36. In contrast, as used with the upper roll 30', the sections 36 are large diameter sections and are mounted on the shaft 34 in axially spaced relationship to each other so that a slot or groove 46, with the sections of the shaft 34, or alternatively of the carrier drum (not shown), at the respective slots or grooves 46 in effect being a small diameter section. Outer portions of the disks 44 of the lower roll 31' are respectively received in the slots or grooves 46, with the latter being dimensioned so that there is a close fit between opposite faces of each disk 44 and the end faces of the adjacent sections 36 of the roll 30'. In this embodiment the center-to-center spacing of the slots 46 is approximately 25 mm. Thus, as the rolls 30' and 31' counter-rotate during operation, the cutting disks 44 of the roll 31' will slide along the end faces of the sections 36, i.e., the walls bordering the slots 44 of the roll 30', in such a way that a self-sharpening effect results.

One way of forming the slots 46, or their equivalent, would be to mount spacers (not shown), each having a thickness approximately equal to that of the disks 44 and having a smaller outside diameter than the sections 36, on the shaft 34.

Another way of forming the slots or grooves 46 would be to provide the outer end face portion each of the identical sections 36 with an annular recess in which, in the case of the roll 31', annular disks are mounted for performing the function of the sections 44, while in the case of the roll 30', the recesses form slots or grooves receiving the outer portions of the disks of the roll 31'.

Still another way to make the roll 30' would be to start with a cylindrical roll having a length equal to the sum of the thicknesses of the plates 36 and to turn or saw slots into the roll at the desired intervals. In this situation, teeth having the profile of the teeth 42 would also extend the full length of the roll.

The operation of the invention is thought to be understood from the above description, suffice it to say, that in all described embodiments small leaves or husks that pass through the gap 32 are reduced to a length that corresponds to the distance between the shearing edges defined at opposed end faces of the respective sections of the two rolls.

I claim:

1. In a milling arrangement for crop that has been chopped and contains kernels of grain, the arrangement including first and second rolls disposed on parallel axes and defining a nip therebetween, with the rolls adapted for being counter-rotated so as to process the chopped crop when introduced into said nip, the improvement comprising: said first roll having a circumference including a plurality of large diameter sections respectively defined by a plurality of flat cutting discs spaced axially from each other along said first roll and defining a plurality of annular grooves respectively having bottoms forming a plurality of small diameter sections; said second roll having a circumference including a second plurality of large diameter sections which are identical in width and diameter to said plurality of small diameter sections of said first roll and are spaced axially from each other along said second roll by a distance substantially equal to a width dimension of each of said flat cutting discs thereby defining a second plurality of annular grooves having bottoms forming a second plurality of small diameter sections; said plurality of flat cutting discs of said first roll respectively having outer portions slidably received in said plurality of annular grooves of said second roll; and said plurality of small diameter sections of said first roll and said large diameter sections of said second roll each having circumferential surfaces equipped with a tooth profile with respective ones of the small diameter sections of said first roll being located opposite to respective ones of the large diameter sections of said second roll, with the opposed tooth profiles being spaced from each other to define a radial dimension of such relationship to a minimum cross-sectional dimension of the kernels contained in the chopped crop which is to be milled that the kernels passing through said gap will be grated or at least partially crushed.

2. The milling arrangement defined in claim 1 wherein said plurality of small diameter and large diameter sections of said first roll and at least said plurality of large diameter sections of said second roll are defined by separate pieces mounted on a respective shaft of the first and second rolls.

3. The milling arrangement defined in claim 1 wherein said large diameter sections of said first roll and said annular grooves of said second roll are so dimensioned that the depth of penetration of the large diameter sections into respective annular grooves is at least as far as a tooth height of said tooth profile.

* * * * *